United States Patent [19]

Calvert, Jr.

[11] Patent Number: 4,476,396

[45] Date of Patent: Oct. 9, 1984

[54] LOW-HEAD HYDROELECTRIC GENERATION SYSTEM

[75] Inventor: James D. Calvert, Jr., Jackson, Mich.

[73] Assignee: Commonwealth Associates Inc., Jackson, Mich.

[21] Appl. No.: 424,013

[22] Filed: Sep. 27, 1982

[51] Int. Cl.³ .................... F03B 13/08; E02B 9/08; E02B 9/04; F01D 25/28

[52] U.S. Cl. ..................... 290/53; 290/42; 290/43; 290/54; 405/77; 405/78

[58] Field of Search .............. 290/42, 43, 53, 54; 60/327, 719; 405/77, 78; 415/2; 416/85, 86, 87

[56] References Cited

U.S. PATENT DOCUMENTS

| | | | |
|---|---|---|---|
| 313,746 | 3/1885 | Man | 290/43 |
| 867,192 | 9/1907 | Dawson | 290/43 |
| 904,892 | 11/1908 | Pattosien | 290/54 |
| 3,965,365 | 6/1976 | Parr | 290/42 X |
| 3,978,345 | 8/1976 | Bailey | 290/54 |
| 3,986,787 | 10/1976 | Mouton, Jr. et al. | 290/54 X |
| 4,001,597 | 1/1977 | Graff | 290/42 X |
| 4,053,787 | 10/1977 | Diggs | 290/43 X |
| 4,078,388 | 3/1978 | Atencio | 61/19 |
| 4,108,579 | 8/1978 | Martinez et al. | 290/42 X |
| 4,117,676 | 10/1978 | Atencio | 60/327 |
| 4,123,185 | 10/1978 | Hagen et al. | 290/42 X |
| 4,142,823 | 3/1979 | Nickell | 415/2 |
| 4,149,092 | 4/1979 | Cros | 290/43 X |
| 4,163,904 | 8/1979 | Skendrovic | 290/54 |
| 4,228,360 | 10/1980 | Navarro | 290/43 |
| 4,241,283 | 12/1980 | Storer, Sr. | 290/43 X |
| 4,301,377 | 11/1981 | Rydz | 290/43 |
| 4,326,819 | 4/1982 | Atencio | 290/53 X |
| 4,345,159 | 8/1982 | Atencio | 290/43 |

Primary Examiner—John Gonzales
Assistant Examiner—Terry Flower
Attorney, Agent, or Firm—Beaman & Beaman

[57] ABSTRACT

The invention pertains to a hydroelectric generating system for use with low-head dam and spillway installations. A vessel in the form of a barge contains ballast tanks, pumps and associated structure permitting the vessel to selectively float or to be submerged at a spillway. The vessel contains a plurality of horizontal penstock and draft tube passages extending therethrough each containing a turbine for generating electricity. The vessel is of such configuration as to be floated into the gate of a dam spillway wherein the water flowing therethrough passes through the vessel passages energizing the turbines to generate electricity. Anchor apparatus defined adjacent the spillway and complimentarily shaped abutments defined upon the vessel cooperate to maintain the submerged operative position.

8 Claims, 4 Drawing Figures

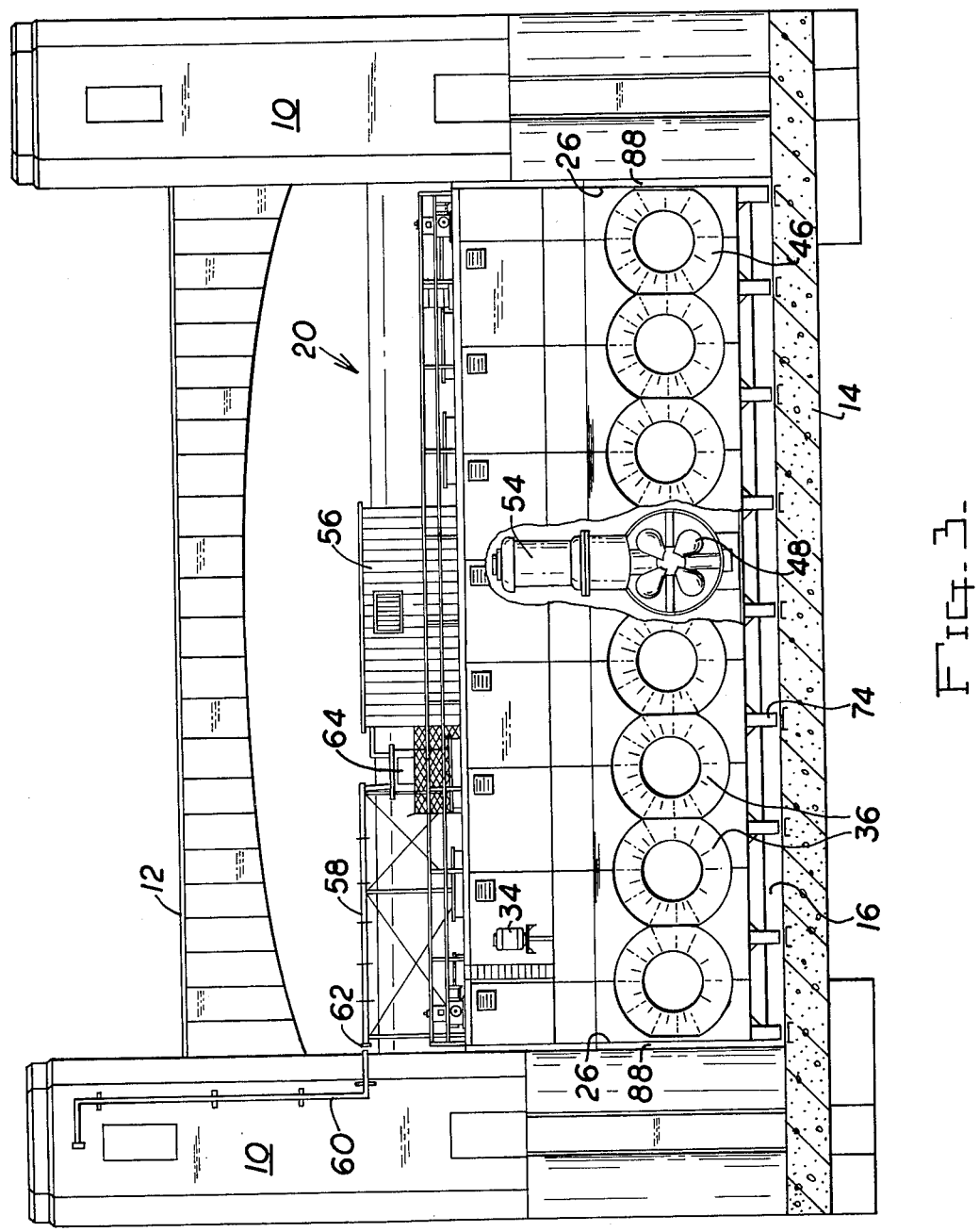

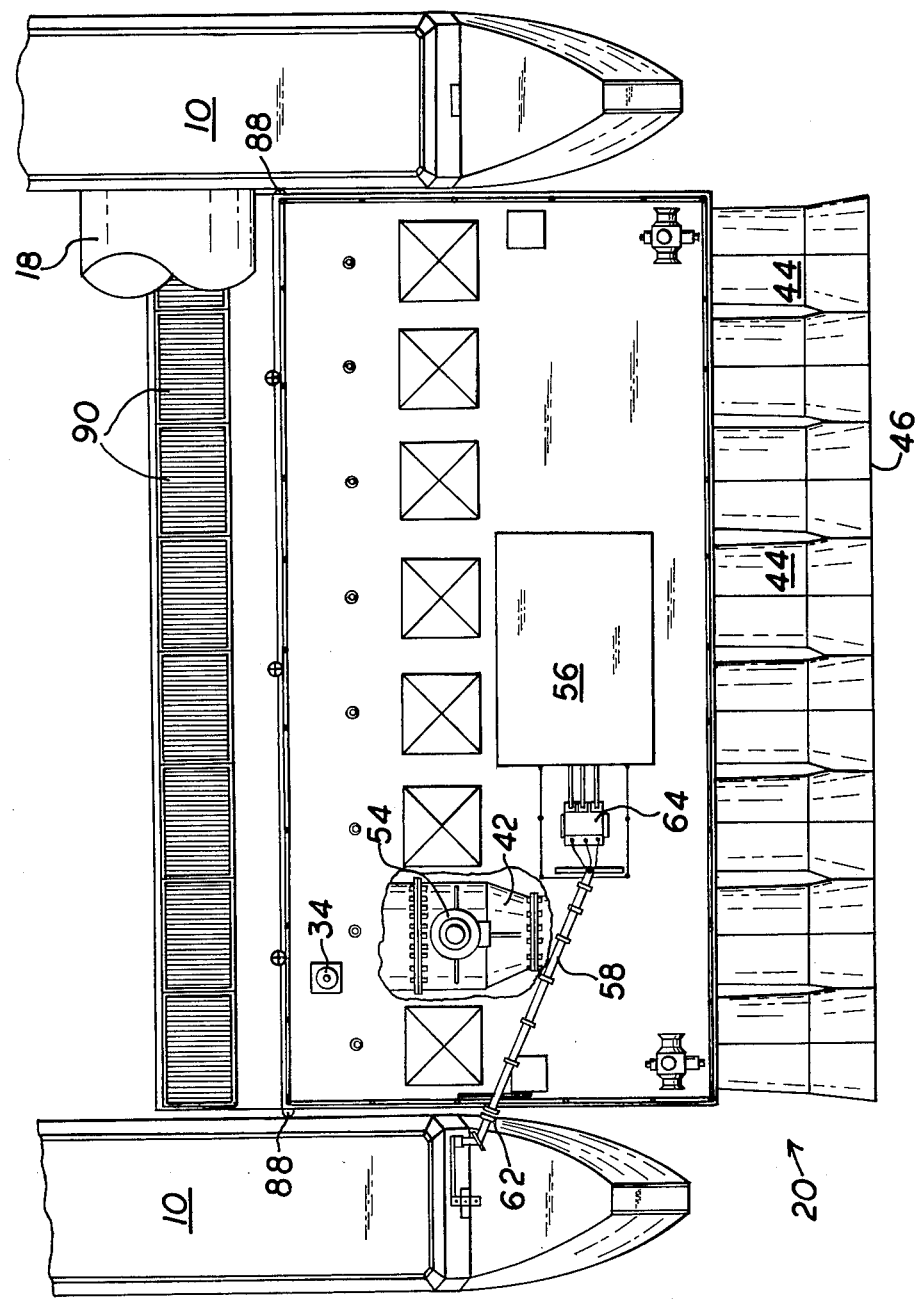

4,476,396

LOW-HEAD HYDROELECTRIC GENERATION SYSTEM

BACKGROUND OF THE INVENTION

It is known to utilize low head systems for hydroelectric generation. However, generation apparatus utilizing the low-head within rivers having flood control dams and spillways has not found widespread usage for a number of reasons. Low-head generating systems may utilize the flow of the current for motive purposes, and such devices are shown in U.S. Pat. Nos. 3,978,345; 4,142,823; 4,163,904 and 4,301,377. It is also known to utilize hydroelectric generating systems of the syphon type in low-head installations, and a sample of such apparatus is shown in U.S. Pat. No. 4,117,676.

A number of dam installations exist in major rivers for flood control purposes, and such dams include a plurality of gated spillways for controlling the water level. Low-head hydroelectric generating apparatus mounted within such spillways would effectively utilize the water flowing therethrough for electric generation purposes, however, during the river flood stages which annually occur such hydroelectric generating apparatus would interfere with the flow of water through the spillways, functioning as a gate, and seriously affect the flood control purpose of the dam. For this reason, hydroelectric generating apparatus has not previously been utilized with low-head dams and spillways of the flood control type in view of the problems arising during high water.

It is an object of the invention to provide a hydroelectric generating system which may be utilized in rivers susceptible to flooding conditions wherein the generating apparatus in no way interferes with flood waters or the operation of the dam for flood control purposes.

Another object of the invention is to provide hydroelectric generating apparatus for use with dams and spillways located within rivers which periodically flood wherein the generating apparatus is only located at its operating position during nonflooding conditions.

Yet another object of the invention is to provide hydroelectric generating apparatus for use with dam spillways in floodable rivers wherein the apparatus may be selectively associated with, and removed from, the spillways depending upon the water level conditions up the river.

A further object of the invention is to provide a hydroelectric generating system for use with river spillways wherein anchor means defined upon the lower regions of the spillway cooperate with a submergible vessel upon which generating apparatus is mounted, the vessel including abutments matingly cooperating with the anchor means.

The method of the invention is practiced by the utilization of a vessel which includes ballast and trim tanks and pumps and valves for controlling the amount of water within such tanks wherein the vessel may be selectively floated or submerged. The vessel includes a plurality of parallel gated passages through which water may flow, and each passage includes a turbine drivingly connected to electric generation means. The lower region of each vessel includes abutment surfaces transversely disposed to the length of the water flow passages for cooperation with anchor means defined upon the lower regions of the river spillways.

Vessels in accord with the invention concepts are floated upstream by means of tugboats or the like into close proximity to dam spillways located within a river. The barge is constructed of a width substantially corresponding to the spillway width, and upon the vessel being properly located to the spillway the ballast and trim tanks are flooded by introducing water from upstream of the dam by gravity flow or by pumps, causing the vessel to submerge to its operating depth within the spillway opening. The spillway gate may then be raised completely from the water, and in effect, the vessel will function as a gate. The water flowing through the spillway enters the vessel passages and drives the associated turbines for electric generation purposes.

Anchor projections formed at the lower region of the spillway cooperate with the abutment surfaces defined upon the vessel wherein the submerged vessel is prevented from being displaced downstream by the spillway anchors, and displacement of the vessel from the spillway opening is only possible after the vessel has been raised from its submerged condition.

The vessel will be located within the spillway opening for the majority of the year. However, when river flooding conditions are expected the vessel pumps and valves are operated to purge the ballast and trim tanks to float the vessel and clear the vessel abutments from the spillway anchors. By means of tugs, or other surface boats, or cable winches, the floating vessel is transported to a safe location during flooding, and water may flow through the spillway unrestricted and controlled by the gate. After the flooding conditions have passed the vessel is retransported to its position adjacent the spillway, its tanks are flooded, and the vessel is submerged to its operative position and placed into operation.

The vessel includes seals along its sides to most effectively utilize the water passing through the spillway, and valves within the vessel passages control the flow of water therethrough.

BRIEF DESCRIPTION OF THE DRAWINGS

The aforementioned objects and advantages of the invention will be appreciated from the following description and accompanying drawings wherein:

FIG. 3 is a downstream, rear elevational view of the hydroelectric generating vessel, portions thereof being broken away, and FIG. 4 is a partially sectioned top plan view of the vessel as located intermediate spillway piers.

DESCRIPTION OF THE PREFERRED EMBODIMENT

Figure 1:
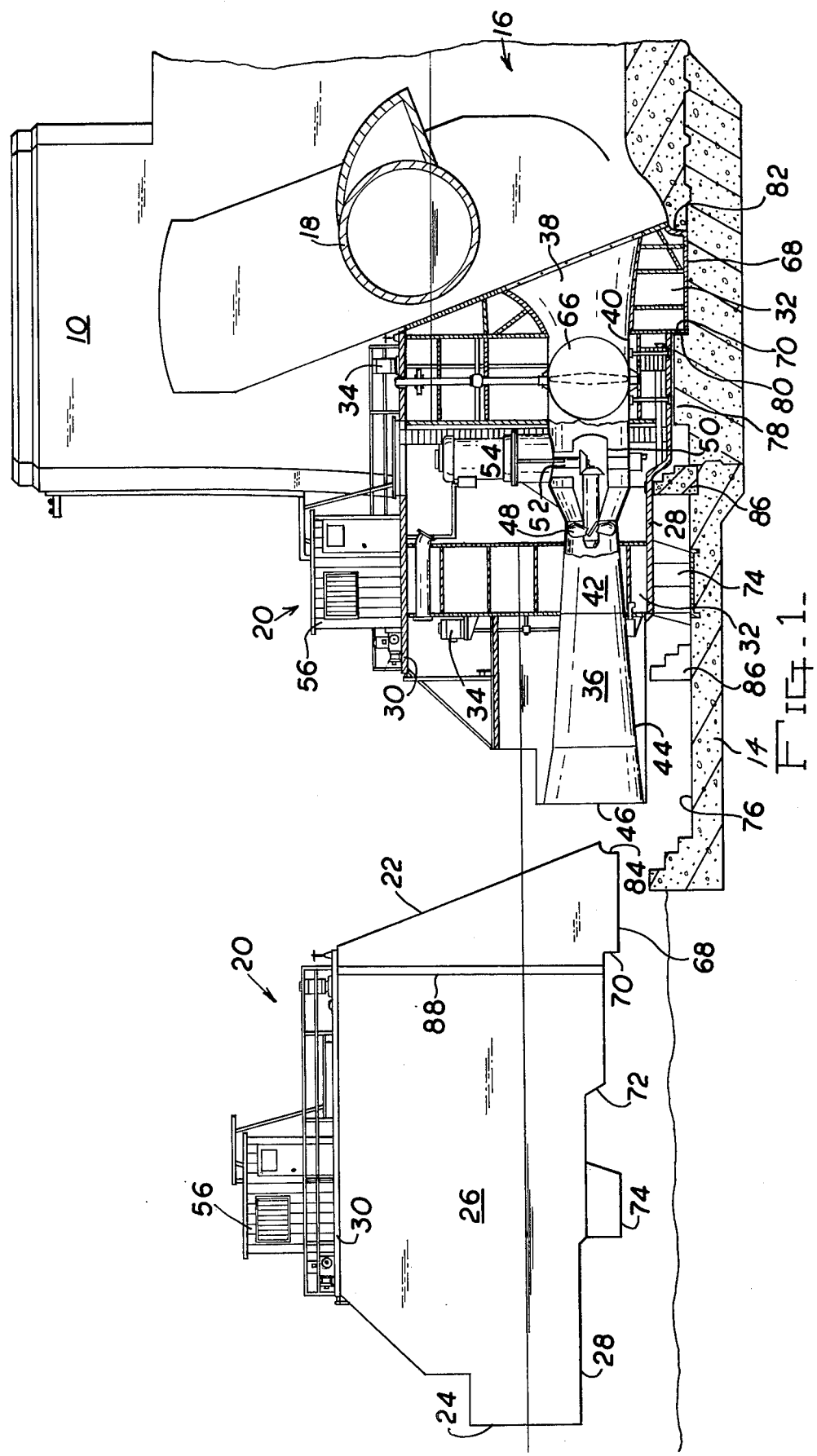
FIG. 1 is an elevational view, partially in section, illustrating a hydroelectric generating vessel in the floating mode, and also illustrating a vessel in the submerged operating mode, the spillway gate being in the open condition.

The apparatus of the invention is designed for use in rivers, and is particularly utilized in major rivers having existing flood control dams and spillways. Such flood control installations commonly include spillway structure including a plurality of spaced piers supported upon large foundations or bedrock, and in the drawings such piers are represented at 10 and may be interconnected by bridge structure 12 which may constitute a small service bridge, or if desired, the piers may support vehicle bearing bridge structure. The spillways include a lower region including a concrete floor 14, FIG. 1, and the opening 16 between adjacent piers is bridged by a gate to control the water flow therethrough. In FIG. 1 a roller gate 18 is illustrated, and this gate, which is of known construction, is moved by a rolling action between a lower position for restricting water flow between the piers, and an upper position (shown) permitting unrestricted flow, as necessary during flood conditions.

The hydroelectric generating vessel of the invention is located between adjacent spillway piers within the spillway opening 16, and in effect, replaces the spillway gate. Preferably, the vessel is sealed with respect to the piers such that all water flowing therethrough will pass through the vessel turbines, and the vessel will continue to maintain the head differential upstream and downstream of the spillway.

In the illustrated embodiment, the hydroelectric vessel 20 is in the form of a barge of a generally rectangular plan configuration, FIG. 1 having a bow 22, a stern 24, sides 26, a bottom 28, and a deck 30. The width of the vessel as determined by the sides 26 is slightly less than the spacing between adjacent spillway piers 10, and the vessel height is sufficient to accommodate the water depth at the spillway opening.

Figure 2:
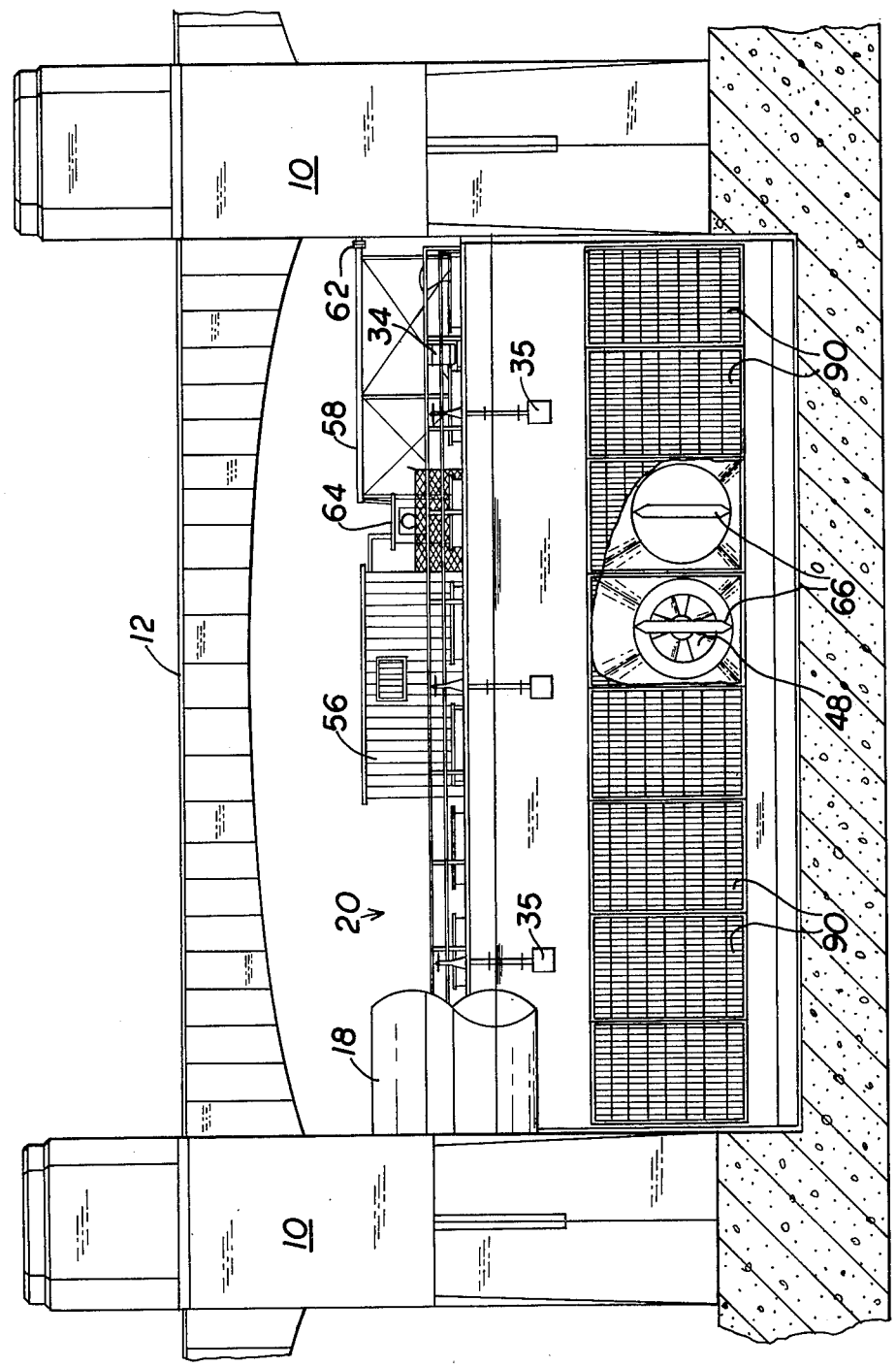
FIG. 2 is a front, upstream elevational view of the hydroelectric apparatus of the invention, portions of the trash rack being broken away for purpose of illustration.

The vessel includes a plurality of ballast and trim tanks 32, FIG. 1, and these tanks are controlled by motorized pumps 34, and associated valve structure including valves and ports 35 whereby the tanks may be selectively flooded or emptied to control the buoyancy of the vessel. The vessel is capable of freely floating, as shown at the left in FIG. 1, and in its operative condition is submerged as shown at the right of FIG. 1, and in FIGS. 2-4.

The vessel 20 also includes a plurality of water passages defined through the vessel extending from the bow 22 to the stern 24. The configuration of the passages 36 is best illustrated in FIG. 1 wherein the passages include an inlet 38 at the bow, an enlarged cylindrical penstock portion 40 which is necked at 42 to a reduced draft tube portion 44 which diverges to the passage outlet 46 at the vessel stern. The number of water passages 36 defined in the vessel are determined by the size of the spillway opening, size of the turbines to be used, the water flow capacity of the river, the head and other considerations. In the disclosed embodiment eight passages are defined in the vessel in side-by-side relationship parallel to the vessel sides 26, and the passages fully occupy the vessel width. In this matter the vessel is able to accommodate maximum water flow.

A turbine is mounted within each passage 36 and includes a propeller 48, FIG. 1, located at the reduced diameter portion 44. The propeller is rotatably supported within a right angle transmission 50, and through appropriate beveled gearing drives the shaft 52 of generator 54. Such right angle drives for low-head hydroelectric generation systems are known as sold by Hydroenergy Systems Inc. of New York, N.Y. Each of the passages 36 has a turbine propeller located therein driving a separate generator, FIG. 4, and the electrical output of the generators 54 is supplied to a control house 56 and conducted through bus line 58 to the distribution conductor 60 mounted upon a spillway pier. The bus and conductor are disconnectable at fittings 62 to permit the bus to be disconnected from the pier distribution system when the hydroelectric generating vessel is removed from its associated spillway. A transformer is represented at 64, and the controls for the ballast pumps and motors may be located within the control house 56 mounted upon the deck 30.

A butterfly valve 66 is pivotally mounted in each passage upon a vertical axis between the inlet 38 and the passage necked portion 42. Each valve is controlled by suitable operating structure within control house 56 for rotating the valve and controlling the amount of water flow through the associated passage.

The bottom of the vessel 20 is of such configuration as to define abutment surfaces for anchoring the vessel to the spillway. In the disclosed embodiment the vessel bottom includes a bow projection 68 which extends vertically downwardly beyond the general configuration of the vessel bottom defining a protuberance extending the width of the barge and forming an abutment surface 70 which is perpendicular to the length of the associated passages 36. Also, the bottom of the vessel is formed upwardly at 72, and leg portions 74 extend downwardly from the vessel.

The floor of the spillway is preferably formed in a manner to most effectively accommodate the submerged vessel 20. As shown in FIG. 1, the spillway floor 14 is of poured concrete and includes an upper surface 76. The illustrated floor includes a rectangular anchor pad 78 extending the width of the spillway opening 16, and defines a planar surface 80 facing the spillway opening perpendicularly disposed to the flow of water through the spillway, and perpendicularly disposed to the length of the passages 36. The spillway floor includes the shaped portion 82 immediately below the roller gate 18, and the bow of the vessel is provided with a concave portion 84 complimentary in configuration to the spillway convex portion 82. Further, as appreciated in FIG. 1, the transverse surface 72 of the vessel will be disposed in opposed relationship to the spillway dissipator blocks 86 and the legs 74 rest upon the spillway floor surface 76.

The lateral sides 26 and bottom of the vessel preferably include vertically and horizontally disposed rubber or plastic seals 88 capable of engaging the pier sides sealing the vessel to the sides and insuring the most effective use of the water flowing through the spillway openings.

Grilled trash racks 90 are mounted upon the bow of the vessel and extend over the passage inlets 38 for the purpose of preventing floating debris, such as logs or the like, from entering the passages 36 and possible blocking the passages or damaging the turbines.

In operation, originally, the vessel or barge 20 will have its ballast and trim tanks 32 emptied wherein the vessel will float within the water well above the river bed, and the spillway floor as shown at the left in FIG. 1. While the vessel could be self-propelled in the preferred construction the vessel will be towed or pushed by a tugboat upstream to the spillway with which it will be associated.

With the spillway gate 18 in its lowermost position to restrict the flow of water through the openings 16 the vessel 20 is maneuvered upstream in the orientation appearing at the left of FIG. 1 until the vessel bow 22 is located above the spillway floor portion 82. Thereupon, the valves controlling the flow of head water into the ballast and trim tanks 32 are opened to flood these tanks and permit the vessel to descend to its submerged operating position. The vessel is permitted to sink along guides until the vessel projection 68 is oriented to the spillway floor as shown in FIG. 1 wherein the surface 70 will be in opposed relationship to the spillway anchor surface 80 and the legs 74 will rest upon the spillway floor surface 76. After the vessel is sealed and anchored into place the gate 18 may be raised to open the associated spillway and the butterfly valves 66 may be opened, as desired, permitting water flow through the passage 36. As the water passes through the passages the associated turbine will be energized and electricity generated and fed into the distribution system through the conductors 60.

Such installation and use of the electric generating vessel 20 occurs throughout the major portion of the year when the river water is at normal stages. However, under a flood water warning the spillway gate 18 may be temporarily closed, the vessel ballast and trim tanks 32 are pumped out and the vessel refloated. Of course, prior to floatation of the vessel the fittings 62 are disconnected from the electrical distribution system, as are any other support lines. The floating vessel 20 is then transported by tug to a protected location during river flooding, and the vessel in no way will interfere with the flow of water through the spillway under flood conditions. After the flooding has subsided the vessel may be returned to its operative condition adjacent a spillway and submerged to the depth shown in FIG. 1. In the practice of the invention expensive construction procedures are not required, and no environmental impact occurs in the utilization of such lowhead hydroelectric generating systems. The seals 88, which may be of the inflatable type, are interposed between the vessel and the pier sides, and insure that substantially all of the water flowing through the spillway is utilized in the generation of electricity.

The passages 36 are preferably formed of formed plate steel and accordingly, the center line spacing of the passages is minimized increasing the total output of electricity produced. The use of water ballast renders the disclosed construction feasible in that a steel plate vessel would not have the desired weight. Of course, in most river flood control installations a plurality of piers 10 and spillway openings occur and a vessel 20 is utilized with each spillway opening. By removing the hydroelectric generating vessel during flood conditions maintenance is minimized, and apparatus of the disclosed type is capable of recovering large amounts of electrical energy from sources heretofore underutilized.

Although high forces will be imposed upon the submerged merged vessel by the higher water on the upstream side, the positive locking engagement between the vessel abutment and the anchor surfaces defined upon the spillway floor will rigidly maintain the vessel in position and resist displacement thereof.

It is appreciated that various modifications to the inventive concepts may be apparent to those skilled in the art without departing from the spirit and scope of the invention.

1. A method of hydroelectric generation in rivers susceptible to flood conditions wherein spillway structure having an opening, a gate and anchor means is located within the river utilizing a barge having controlled ballast tanks, anchor means, and supporting a hydroelectric turbine comprising the steps of:
   (a) during nonflooding river conditions emptying the ballast tanks and floating the barge into a spillway into alignment with the opening thereof,
   (b) flooding the ballast tanks to submerge the barge within the spillway opening and engage the spillway structure and barge anchor means to anchor the barge within the opening,
   (c) raising the spillway gate to permit water to flow into the turbine and generate electricity,
   (d) removing water from the ballast tanks in the event of flood conditions to refloat the barge and disengaging the spillway structure and barge anchor means, and
   (e) removing the refloated barge from the spillway to permit unrestricted flow through the spillway.

2. The method of hydroelectric generation of claim 1 wherein the spillway includes first anchor means transversely disposed to water flow through the spillway, and second anchor means defined upon the barge of complimentary configuration to the first anchor means comprising the step of intermating the first and second anchor means upon submerging the barge within the spillway to prevent barge displacement during generation due to water flow through the spillway.

3. In a hydroelectric generating system for rivers, in combination, a vessel, at least one ballast tank defined upon said vessel, pump and valve means mounted upon said vessel regulating the amount of water within said ballast tank to control the buoyancy characteristics of said vessel between floating and non-floating conditions, a water passage defined in said vessel having an inlet and an outlet, anchor means defined in the bed of the river in which said hydroelectric generating system is utilized, abutment means defined upon said vessel mating with said anchor means when said vessel is in its non-floating condition to prevent movement of the vessel in a downstream direction, and hydroelectric turbine means within said passage operated by the flow of water therethought whereby said vessel may be selectively floated to a location of use, submerged into an operative position and refloated for relocation purposes.

4. In a hydroelectric generating system as in claim 3, a valve located within said passage intermediate said inlet and the associated turbine means.

5. In a hydroelectric generating system as in claim 3, said anchor means comprising a concrete spillway floor having vertically extending barriers having surfaces facing upstream and transversely disposed to the direction of river flow, and said abutment means includes downwardly extending projections having surfaces facing downstream and transversely disposed to the direction of river flow adapted to engage said barrier surfaces.

6. A hydroelectric generating system for rivers comprising, in combination, at least one fixed spillway within the river having a lower region adjacent the river bed, vertically disposed anchor means defined upon said spillway lower region, a vessel, at least one ballast tank defined upon said vessel, pump and valve means mounted upon said vessel regulating the amount of water within said ballast tank to control the buoyancy characteristics of said vessel between floating and non-floating conditions, a water passage defined in said vessel having an inlet and an outlet, and hydroelectric turbine means within said passage operated by the flow of water therethrough, and abutment means defined upon said vessel mating with said anchor means when said vessel is in said non-floating condition to prevent movement of the vessel in a downstream direction.

7. In a hydroelectric generating system as in claim 6, wherein said anchor means and abutment means each include vertically disposed surfaces adapted to engage in opposed relation upon said vessel submerging to the non-floating condition.

8. In a hydroelectric generating system as in claim 7 wherein said spillway includes spaced vertically extending side walls, lateral sides defined upon said vessel adapted to be located adjacent the spillway side walls when said vessel is in a non-floating condition wthin the spillway and said abutment means mate with said anchor means, and vertically extending seals defined on said vessel side engaging the side walls to seal said vessel within the spillway.

* * * * *